United States Patent
Yu

(10) Patent No.: US 9,175,621 B2
(45) Date of Patent: Nov. 3, 2015

(54) ENGINE MANAGEMENT STRATEGY

(71) Applicant: Songping Yu, Troy, MI (US)

(72) Inventor: Songping Yu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 357 days.

(21) Appl. No.: 13/621,344

(22) Filed: Sep. 17, 2012

(65) Prior Publication Data

US 2014/0081560 A1    Mar. 20, 2014

(51) Int. Cl.
*F02D 35/02* (2006.01)
*F02D 41/00* (2006.01)
*F02D 37/02* (2006.01)

(52) U.S. Cl.
CPC .............. *F02D 35/027* (2013.01); *F02D 37/02* (2013.01); *F02D 41/0002* (2013.01); *F02D 41/008* (2013.01); *F02D 2041/001* (2013.01); *Y02T 10/42* (2013.01)

(58) Field of Classification Search
CPC ........ F02D 2041/001–2041/002; F02D 35/02; F02D 35/027; F02D 17/00; F02D 13/0257; F02D 2250/18; F02D 11/105; F02D 37/02; F01L 1/34; F01L 2800/00; F02P 5/152
USPC ................ 701/111, 103; 123/406.21, 406.16, 123/406.29, 90.15
See application file for complete search history.

(56) References Cited

U.S. PATENT DOCUMENTS

| | | | | |
|---|---|---|---|---|
| 4,364,353 A | * | 12/1982 | Fiala | 123/350 |
| 5,706,784 A | * | 1/1998 | Steinbrenner et al. | 123/406.29 |
| 5,845,613 A | * | 12/1998 | Yoshikawa | 123/90.15 |
| 6,308,670 B1 | * | 10/2001 | Hammoud et al. | 123/90.15 |
| 6,390,040 B1 | * | 5/2002 | Hammoud et al. | 123/90.15 |
| 6,769,404 B2 | * | 8/2004 | Aoyama et al. | 123/406.29 |
| 6,848,422 B2 | * | 2/2005 | Hashizume et al. | 123/406.29 |
| 6,932,054 B2 | * | 8/2005 | Kikori | 123/347 |
| 7,152,560 B2 | * | 12/2006 | Miyanoo et al. | 123/90.15 |
| 8,255,142 B2 | * | 8/2012 | Cunningham et al. | 701/111 |
| 8,631,782 B2 | * | 1/2014 | Smith et al. | 123/406.16 |
| 2011/0083640 A1 | * | 4/2011 | Garagnani et al. | 123/406.29 |

FOREIGN PATENT DOCUMENTS

| | | |
|---|---|---|
| DE | 19807488 C1 | 9/1999 |
| DE | 19859424 A1 | 6/2000 |
| DE | 102006029279 B3 | 10/2007 |
| EP | 1526265 A2 | 4/2005 |
| EP | 2314862 A1 | 4/2011 |
| JP | 2004360562 A | 12/2004 |

OTHER PUBLICATIONS

International Search Report and Written Opinion dated Nov. 11, 2013 for International Application No. PCT/US2013/056412, International Filing Date Aug. 23, 2013.

* cited by examiner

*Primary Examiner* — Stephen K Cronin
*Assistant Examiner* — Susan E Scharpf
(74) *Attorney, Agent, or Firm* — Ralph E. Smith

(57) ABSTRACT

A system and method for controlling a vehicle to implement an engine torque management strategy. The engine torque management strategy implements a sophisticated engine knock control method that alleviates/mitigates the cause of the knock while also optimizing vehicle performance and engine efficiency without compromising engine hardware protection. Whenever suitable, the system and method attempt to reduce the amount of air trapped in a knocking cylinder to reduce its effective compression ratio and to eliminate the knock while keeping the same optimal spark timing for combustion efficiency.

18 Claims, 2 Drawing Sheets

ENGINE MANAGEMENT STRATEGY

FIELD

The present disclosure relates generally to internal combustion gas engines and more particularly to a method of controlling engine torque, particularly during engine knock events.

BACKGROUND

Internal combustion engines may be susceptible to undesired detonation under certain conditions. Undesired detonation may cause increased pressure build-up and heating that can degrade engine components as well as decrease engine efficiency. This undesirable situation is often accompanied by a certain engine noise often referred to as a ping or a knock. The ping or knock is often within a specified frequency range. As such, most approaches for identifying and addressing detonation such as engine knock often include placing acoustic sensors designed to detect the specified frequency within the engine block, cylinder head or even the intake manifold. "Knock sensors" contain piezoelectric elements that are tuned to the engine knock frequency. Vibrations from the engine knock will vibrate the piezoelectric element, which generates a voltage that can be sent to the engine control unit (ECU). The ECU will use this voltage input to detect the knock and react accordingly.

Regardless of how the engine knock is determined or reported to the ECU, current knock control countermeasures primarily rely on ignition spark adjustment, also known as "spark retard," to mitigate and eliminate the detonation. Unfortunately, since spark is being retarded from its optimal set-point (e.g., from its "minimum spark for best torque" (MBT) set-point), the engine's operational efficiency decreases. This decrease in efficiency will degrade the vehicle's fuel economy. Moreover, the engine's output torque will reduce, compromising the vehicle's performance and its drivability. Accordingly, there is a need and desire for a knock control technique that can optimize vehicle performance and engine efficiency without compromising engine hardware protection.

SUMMARY

In one form, the present disclosure provides a method of controlling an engine system of a vehicle. The method comprises detecting, at a processor, engine knock in at least one engine cylinder; calculating, at the processor, knock density for each cylinder in which engine knock was detected; and performing air management on all engine cylinders based on the calculated knock density for each cylinder in which engine knock was detected.

The present disclosure also provides an engine torque management system of a vehicle. The system comprises at least one knock sensor associated with at least one engine cylinder; and a controller connected to the at least one knock sensor. The controller adapted to detect engine knock in at least one engine cylinder; calculate knock density for each cylinder in which engine knock was detected; and perform air management on all engine cylinders based on the calculated knock density for each cylinder in which engine knock was detected.

In one embodiment, performing air management on all engine cylinders comprises reducing air in all cylinders in which engine knock was detected and increasing air in all cylinders in which engine knock was not detected.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

With the development of advanced valve train technologies (e.g., MultiAir®), it is now possible to control the amount of air used for combustion in each individual engine cylinder. As such, the techniques disclosed herein provide an engine torque management strategy that implements a much more sophisticated knock control method that alleviates/mitigates the cause of the knock while also optimizing vehicle performance and engine efficiency without compromising engine hardware protection.

Figure 1:
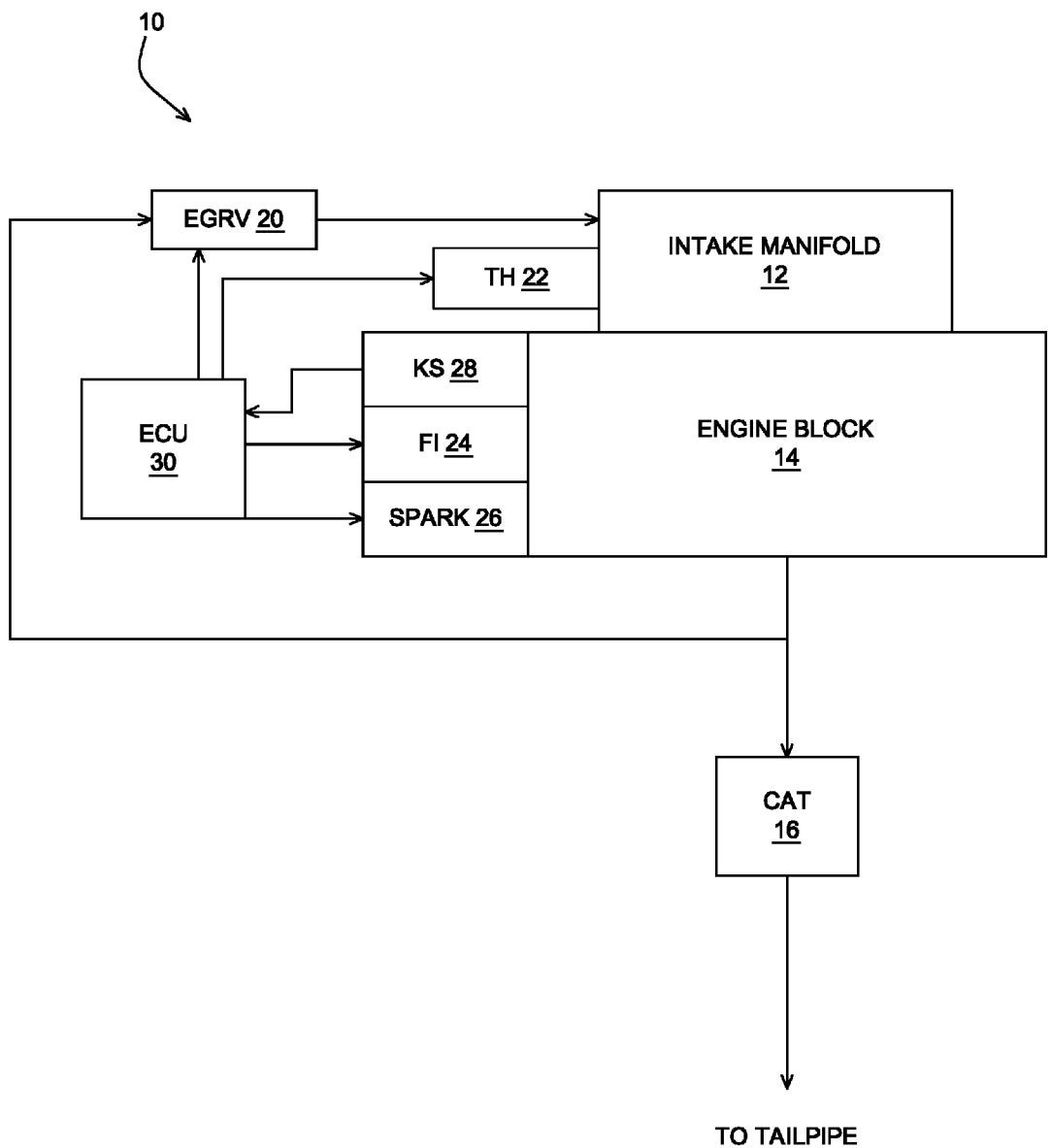
FIG. 1 illustrates a system for implementing engine torque control on a vehicle in accordance with an embodiment disclosed herein.

FIG. 1 illustrates an example engine torque control system 10 for a vehicle that may be programmed to perform the novel control method 100 (FIG. 2) disclosed herein. The system 10 comprises an intake manifold 12 connected to an engine block 14. Exhaust from the engine block 14 is passed through a catalytic converter 16 and to the vehicle's tailpipe. A portion of the exhaust is recirculated to the intake manifold 12, via an exhaust gas recirculation (EGR) valve 20, where the recirculated exhaust is mixed with fresh air and re-introduced into the combustion chamber of the engine block 14. The valve 20 is controlled by an engine control unit (ECU) 30 or other suitable controller. The ECU 30 could be a processor programmed to perform the method 100 discussed below and/or other necessary controller functions. It should be appreciated that necessary piping/tubing and connections to components within the system 10 are illustrated as connection arrows for convenience purposes and are not numerically labeled in FIG. 1.

The system 10 also comprises other components suitable for detecting engine knock and implementing a torque control strategy that alleviates/mitigates the cause of the knock (i.e., detonation) in accordance with the present disclosure (i.e., method 100). These components include one or more knock sensors (KS) 28 connected to, on or near the engine block 14. In a desired embodiment, there should be at least one knock sensor 28 per engine cylinder. As noted above, the knock sensors 28 could be installed within the intake manifold 12, if desired. The knock sensors 28 will output a voltage level or other signal to the ECU 30. The knock sensor output will have at least one level/value indicative of engine knock associated with a particular cylinder; all other level/values output from the knock sensors 28 are indicative of a cylinder that is not knocking. It should be appreciated that the system 10 can use any type of knock sensor 28, knock sensor location or sensor output type.

The ECU 30 can use the knock sensor 28 output and other engine and vehicle parameters to control a throttle and/or intake valves (TH) 22 connected to the intake manifold 12, fuel injectors (FI) 24 connected to the cylinders within the engine block 14 and spark timing 26 of the cylinders within the engine block 14. It should be appreciated that there is an intake valve for each cylinder. As is discussed below in more detail, the ECU 30 will control these components in a manner that alleviates/mitigates engine knock while also attempting to optimize vehicle performance and engine efficiency. It should be appreciated that FIG. 1 illustrates one example system 10 and the principles disclosed herein are not limited solely to the FIG. 1 illustrated configuration.

Figure 2:
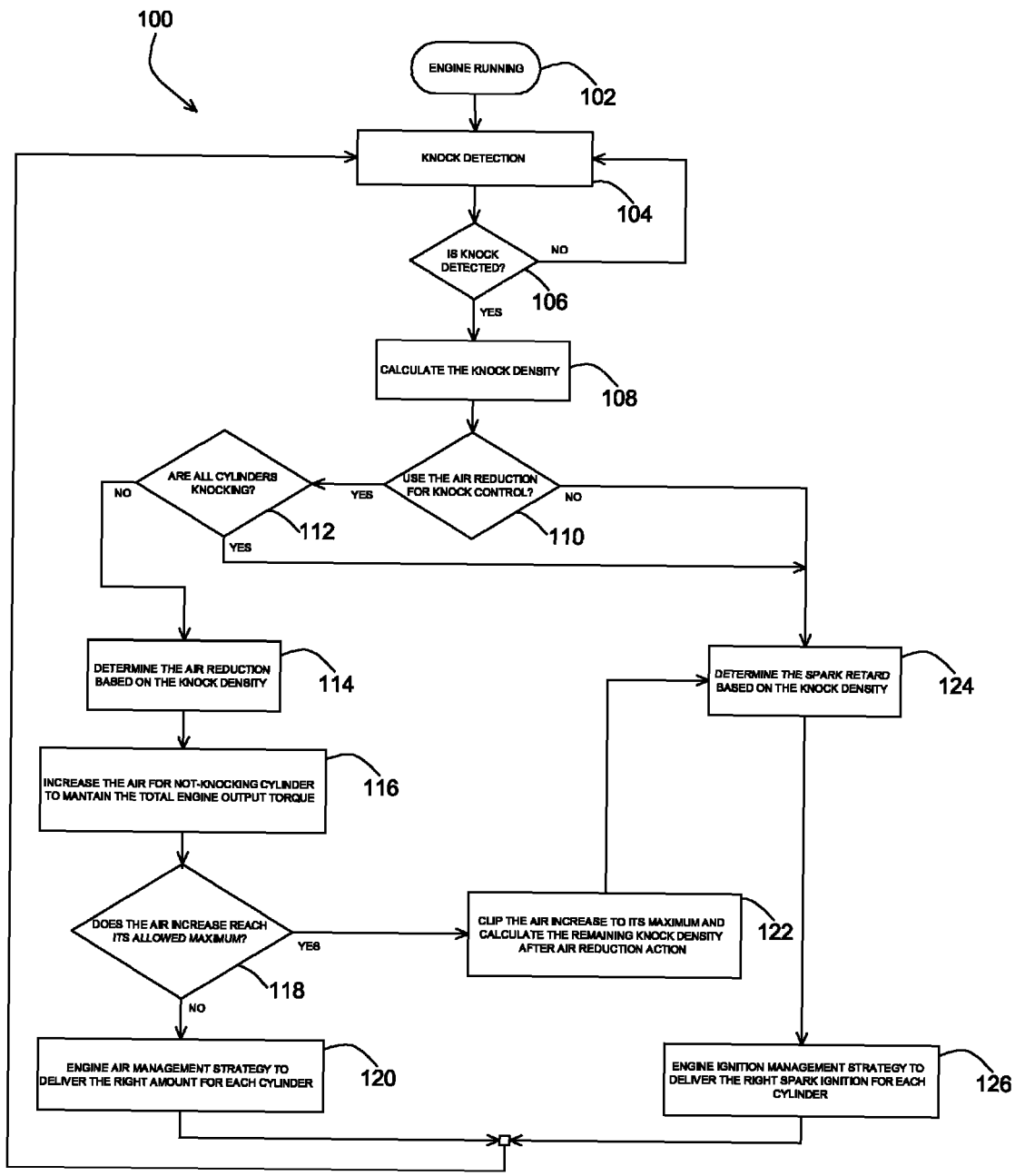
FIG. 2 illustrates a flowchart of a method of controlling engine torque in a vehicle in accordance with an embodiment disclosed herein.

FIG. 2 illustrates a method 100 of controlling the engine torque control system 10 that alleviates/mitigates the cause of engine knock in accordance with an embodiment disclosed herein. In a desired embodiment, the method 100 is implemented in software, stored in a computer readable medium, which could be a random access memory (RAM) device, non-volatile random access memory (NVRAM) device, or a read-only memory (ROM) device) and executed by the engine control unit 30, which may be or include a processor, or other suitable controller within the system 10 of FIG. 1. The computer readable medium can be part of the ECU 30.

As can be seen, the method 100 operates while the vehicle's engine is operating (step 102). Engine knock detection will be armed all of the time while the engine is operating (step 104). At step 106, the ECU 30 uses the voltage level/signal output from the knock sensors 28 (described above) to determine if any of the engine cylinders are knocking (step 106). If the ECU 30 determines that none of the cylinders are knocking, the method continues at step 104 (discussed above).

Once an engine knock event is detected for at least one cylinder (at step 106), the corresponding knock density (also referred to as knock intensity) is calculated by the ECU 30 at step 108. A knock density will be calculated for each knocking cylinder. Instead of retarding ignition spark proportionally to the knock density, as is typically performed in prior art systems, the engine controller and method 100 will first attempt to reduce the amount of air trapped in each knocking cylinder to reduce its/their effective compression ratio and to eliminate knocking while keeping the same optimal spark timing for combustion efficiency. The amount of air reduction in the knocking cylinder will be proportional to the detected knock density. Initially, at step 110, the method 100 determines if air reduction for knock control is desirable for the system 10. This can be performed by checking the status of a switch, programmed setting or flag that was set by a calibration routine whereby the effectiveness of using air reduction versus using spark retard for knock elimination was determined. If air reduction is more effective, it is the most desirable technique to employ for the reasons set forth above (e.g., vehicle performance and engine efficiency) and the air reduction control switch/setting/flag will be set to a value indicating that air reduction should be used (a "yes" response at step 110). Otherwise, the air reduction control switch/setting/flag will be set to a value indicating that air reduction should not be used (a "no" response at step 110).

The ratio of knock reduction effectiveness using spark retard versus air reduction is one way to determine whether air reduction is more desirable. This ratio can be determined during calibration, on a dynamometer, or by any other suitable mechanism. This ratio $Ratio_{KE}$ can be calculated as follows:

$$Ratio_{KE} = (\text{percent torque loss due to spark retard to eliminate knock completely/percent torque loss due to air reduction to eliminate knock completely}) \quad (1)$$

The percent torque loss due to spark retard and the percent torque loss due to air reduction will be determined under the same operation conditions. A ratio $Ratio_{KE}$ having a value of greater than or equal to 1.0 indicates that air reduction is more effective in a torque preserve sense. A ratio $Ratio_{KE}$ less than 1.0 indicates that spark retard is more effective.

Regardless of how the air reduction control switch/setting/flag is set, if it is determined that air reduction should not be used (a "no" at step 110), the method 100 continues at step 124 for knock reduction based on spark retard (discussed below). If, however, it is determined that air reduction should be used (a "yes" at step 110), the method 100 continues at step 112 to determine if all of the cylinders are knocking. If all of the engine's cylinders are knocking, air reduction should not be used. As such, if all of the engine's cylinders are knocking (a "yes" at step 112), the method 100 continues at step 124 (discussed below).

If it is determined that at least one, but not all of the engine's cylinders are knocking, air reduction may be used. As such, if less than all of the engine's cylinders are knocking (a "no" at step 112), the method 100 continues at step 114 where air reduction for the knocking cylinders is determined by the ECU 30. The ECU 30 will use the knock density calculated at step 108 as an index into a table of values used to set the throttle (or cylinder intake valves) 22 and/or fuel injector 24 associated with the knocking cylinder to reduce the amount of air and/or fuel within the cylinder. The table can be populated during a calibration routine or by any means suitable. The table can be implemented in software or hardware.

The torque loss due to the air reduction in the knocking cylinder(s) will be made up by increasing the air target for the non-knocking cylinder(s) in an attempt to maintain the same engine output (step 116). The amount of air increase per each non-knocking cylinder is determined as follows:

$$\Delta M_{pernonknocking} = \frac{\Sigma \Delta M_{perknocking} * \rho spk_{knocking}}{\Sigma \rho spk_{nonknocking}} \quad (2)$$

Where:
$\Delta M_{pernonknocking}$ is the delta air increase per each non-knocking cylinder;
$\Delta M_{perknocking}$ is the delta air reduction per knocking cylinder;
$\rho spk_{knocking}$ is the spark torque efficiency in the knocking cylinder; and
$\rho spk_{nonknocking}$ is the spark torque efficiency in the non-knocking cylinder.

At step 118, it is determined whether the amount of air for each non-knocking cylinder reaches its maximum or the amount of air for the knocking cylinders reaches a minimum limit for combustion stability. If the amount of air for each non-knocking cylinder reaches its maximum or the amount of air for the knocking cylinders reaches a minimum limit for combustion stability (a "yes" at step 118), the method 100 continues at step 122 where the air increases are clipped to their maximum. In addition, the air decreases for the knocking cylinders are clipped to the minimum and any remaining knock density is calculated after the air reduction.

At step 124, a spark retard strategy will be used by the ECU 30 to protect the engine hardware. Thus, to provide calibration flexibility and to deal with situations where air adjustment is not desirable, feasible or completely effective, the method 100 allows the mixing of air reduction with spark timing adjustment. After the percentage of desired spark retard is determined, the remaining amount of air reduction required to eliminate the engine knock will be calculated automatically based on detected knock intensity. The level of mixing will be fully calibrate-able. At step 126, an engine ignition management strategy that delivers the right spark ignition for each cylinder is performed. Spark ignition is controlled via the spark timing control 26.

If, it is determined that the amount of air for each non-knocking cylinder has not reached its maximum or the amount of air for the knocking cylinders has not reached the minimum limit for combustion stability (a "no" at step 118), the method 100 continues at step 120 where an engine air management strategy that delivers the right amount of air and fuel to each cylinder is performed. Air management is controlled by the ECU 30 via the throttle or intake valves 22.

The system 10 and method 100 disclosed herein provide several advantages over prior art knock reduction techniques. For example, the engine output torque is maintained whenever possible, which means that vehicle performance and drivability are maintained, while also providing engine hardware protection by preventing engine knock. Moreover, optimal ignition spark timing and thus, vehicle fuel economy is maintained whenever possible, even though engine hardware protection is also maintained. The disclosed system and method provide the flexibility of mixing air reduction and spark adjustment for proper knock control to address some specific operational needs.

What is claimed is:

1. A method of controlling an engine system of a vehicle, the engine system including an engine having a plurality of cylinders, the method comprising:
    detecting, at a processor, engine knock in at least one cylinder of the plurality of cylinders;
    calculating, at the processor, knock density for each cylinder in which engine knock was detected, each knock density being indicative of an intensity of the detected engine knock in a corresponding cylinder;
    for each cylinder in which engine knock was detected:
        based on expected engine torque losses, determining, at the processor, whether to perform spark retardation or airflow reduction to decrease the engine knock in the cylinder, and
        based on the determining, performing, by the processor, spark retardation or airflow reduction for the cylinder, the airflow reduction being proportional to the cylinder's calculated knock density; and
    for each cylinder in which engine knock was not detected:
        increasing, by the processor, airflow into the cylinder.

2. The method of claim 1, wherein reducing air in each cylinder in which engine knock was detected and increasing air in each cylinder in which engine knock was not detected comprises adjusting at least one of a throttle and corresponding intake valves associated with the respective cylinders.

3. The method of claim 1, further comprising:
    determining, at the processor, whether the air increase in a cylinder in which engine knock was not detected has reached a maximum level; and
    in response to determining that the air increase in the cylinder in which engine knock was not detected has reached the maximum level, clipping the air increase to the maximum level and calculating a remaining knock density.

4. The method of claim 3, further comprising performing spark retardation based on the remaining knock density.

5. The method of claim 1, further comprising determining whether at least one of airflow reduction or airflow increase can be performed based on a calibration setting.

6. The method of claim 5, further comprising, when spark retardation is determined to be performed based on engine torque losses, controlling spark retardation to mitigate engine knock in each cylinder in which engine knock was detected in response to determining that airflow reduction cannot be performed based on the calibration setting.

7. The method of claim 1, further comprising:
    determining, at the processor, whether engine knock has been detected for all of the plurality of cylinders; and
    when spark retardation is determined to be performed based on engine torque losses, controlling spark retardation in response to determining that engine knock has been detected for all of the plurality of cylinders.

8. The method of claim 1, further comprising determining, by the processor, an amount of air increase for a non-knocking cylinder based on:
    (i) a delta air increase in the non-knocking cylinder,
    (ii) a delta air reduction in a knocking cylinder,
    (iii) a spark torque efficiency in the non-knocking cylinder, and
    (iv) a spark torque efficiency in the knocking cylinder.

9. The method of claim 8, wherein the amount of air increase for the non-knocking cylinder is determined using the following equation:

$$\Delta M_{pernonknocking} = \frac{\Sigma \Delta M_{perknocking} * \rho spk_{knocking}}{\Sigma \rho spk_{nonknocking}},$$

where $\Delta M_{pernonknocking}$ is the delta air increase in the non-knocking cylinder, $\Delta M_{perknocking}$ is the delta air reduction in the knocking cylinder, $\rho spk_{nonknocking}$ is the spark torque efficiency in the non-knocking cylinder, and $\rho spk_{knocking}$ is the spark torque efficiency in the knocking cylinder.

10. An engine torque management system of a vehicle including an engine having a plurality of cylinders, the system comprising:
    at least one knock sensor associated with at least one cylinder of the plurality of cylinders; and
    a controller connected to the at least one knock sensor, the controller being configured to:
        detect engine knock in at least one cylinder of the plurality of cylinders;
        calculate knock density for each cylinder in which engine knock was detected, each knock density being indicative of an intensity of the detected engine knock in a corresponding cylinder;
        for each cylinder in which engine knock was detected:
            based on expected engine torque losses, determine whether to perform spark retardation or airflow reduction to decrease the engine knock in the cylinder, and
            based on the determination, perform spark retardation or airflow reduction for the cylinder, the airflow reduction being proportional to the cylinder's calculated knock density; and
        for each cylinder in which engine knock was not detected:
            increase airflow into the cylinder.

11. The system of claim 10, wherein the controller is configured to reduce air in each cylinder in which engine knock was detected and increase air in each cylinder in which engine knock was not detected by adjusting at least one of a throttle and corresponding intake valves associated with the respective cylinders.

12. The system of claim 10, wherein the controller is further configured to:
determine whether the air increase in a cylinder in which engine knock was not detected has reached a maximum level; and
in response to determining that the air increase in the cylinder in which engine knock was not detected has reached the maximum level, clip the air increase to the maximum level and calculate a remaining knock density.

13. The system of claim 12, wherein the controller is further configured to perform spark retardation based on the remaining knock density.

14. The system of claim 10, wherein the controller is further configured to:
determine whether at least one of air reduction and air increase can be performed based on a calibration setting.

15. The system of claim 14, wherein the controller is further configured to, when spark retardation is determined to be performed based on engine torque losses, control spark retardation to mitigate engine knock in each cylinder in which engine knock was detected in response to determining that air reduction cannot be performed based on the calibration setting.

16. The system of claim 10, wherein the controller is further configured to:
determine whether engine knock has been detected for all of the plurality of cylinders; and
when spark retardation is determined to be performed based on engine torque losses, control spark retardation in response to determining that engine knock has been detected for all of the plurality of cylinders.

17. The system of claim 10, wherein the controller is further configured to determine an amount of air increase for a non-knocking cylinder based on:
(i) a delta air increase in the non-knocking cylinder,
(ii) a delta air reduction in a knocking cylinder,
(iii) a spark torque efficiency in the non-knocking cylinder, and
(iv) a spark torque efficiency in the knocking cylinder.

18. The system of claim 17, wherein the amount of air increase for the non-knocking cylinder is determined using the following equation:

$$\Delta M_{pernonknocking} = \frac{\Sigma \Delta M_{perknocking} * \rho spk_{knocking}}{\Sigma \rho spk_{nonknocking}},$$

where $\Delta M_{pernonknocking}$ is the delta air increase in the non-knocking cylinder, $\Delta M_{perknocking}$ is the delta air reduction in the knocking cylinder, $\rho spk_{nonknocking}$ is the spark torque efficiency in the non-knocking cylinder, and $\rho spk_{knocking}$ is the spark torque efficiency in the knocking cylinder.

* * * * *